No. 857,043. PATENTED JUNE 18, 1907.
H. ENDEMANN.
SCREW PRESS FOR MOLDING TABLETS.
APPLICATION FILED APR. 22, 1907.

Witnesses.
Alois Ružička
Bernhard Deubel

Inventor.
Hubert Endemann

UNITED STATES PATENT OFFICE.

HUBERT ENDEMANN, OF VIENNA, AUSTRIA-HUNGARY.

SCREW-PRESS FOR MOLDING TABLETS.

No. 857,043.      Specification of Letters Patent.      Patented June 18, 1907.

Application filed April 22, 1907. Serial No. 369,682.

*To all whom it may concern:*

Be it known that I, HUBERT ENDEMANN, a subject of the Emperor of Austria, residing at Vienna, in the Province of Lower Austria and Empire of Austria, have invented new and useful Improvements in Screw-Presses for Molding Tablets, of which the following is a specification.

My invention relates to screw presses for molding tablets, and it has for its object so to construct the press that the turning of the screw causes the pulverulent material, of which the tablets are to be made, to be fed into the matrix and the finished tablets to be thrown out.

According to the invention, the supply hopper is mounted upon a sliding carriage adapted to move to and fro over the matrix, and the screw carries a cam by means of which a crank geared with the carriage is operated. Another cam mounted on the screw passes, on the screw being lowered, below a tappet, which is secured to a spring controlled rod parallel to and guided by the side of the screw, and on the screw being raised, the said cam carries the tappet upward, thereby raising the rod, which is geared with the lower die.

Figure 1:
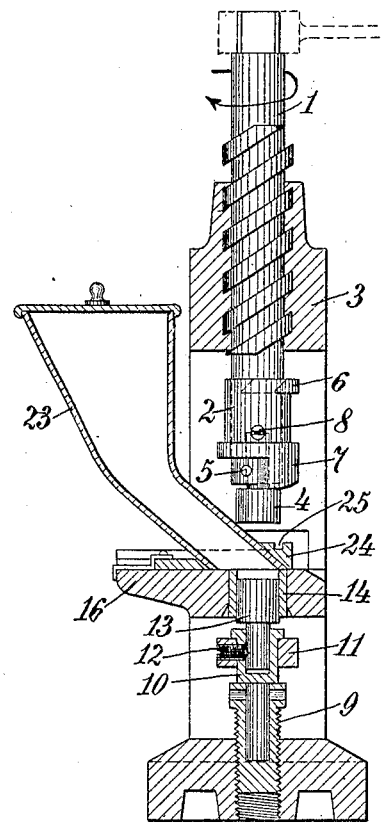
Figure 2:
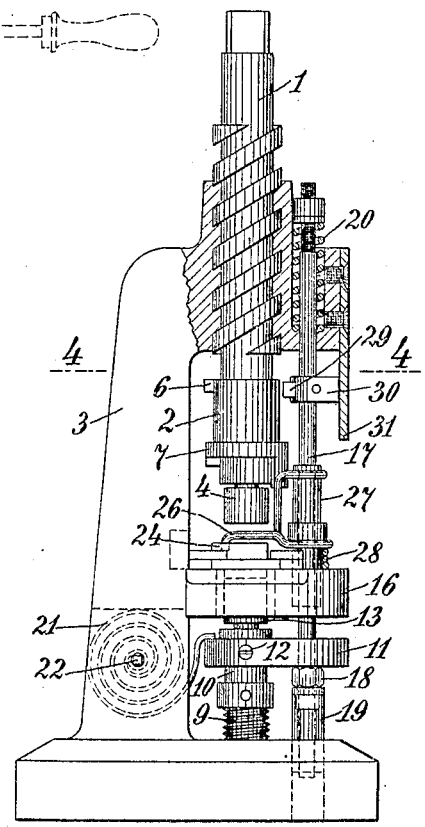
Figure 3:
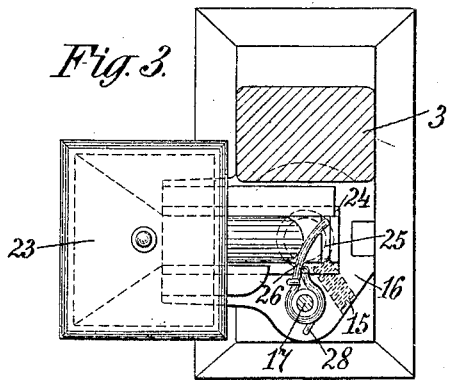
Figure 4:
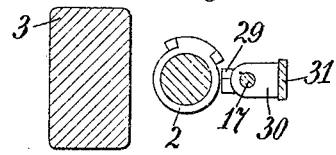

In the drawing, Figure 1 is a sectional front elevation, Fig. 2 a sectional side elevation, and Fig. 3 a horizontal section of a screw press made according to the invention. Fig. 4 is a horizontal section on the line 4—4 in Fig. 2.

It will be seen that a screw 1 is movable in a screw-threaded hole in a standard 3 and carries the upper die 4 which is secured to it by means of a pin 5. The screw 1 also carries a sleeve 2 on which the aforesaid cams 6 and 7 are formed and which is fixed to the screw by means of a screw 8.

Into the base plate of the standard 3 is screwed a screw 9, into the socket or bore of which the die-carrier 10 is inserted. The said die-carrier 10 is surrounded by a collar 11 held in position by the clamping screw 12, which also holds the lower die 13 in the die-carrier. The matrix 14 is clamped by a screw 15 in a hole of the table 16 cast on the standard 3 and projecting laterally.

The cylindrical rod 17 designed to operate the lower die 13, for ejecting the finished tablet, is guided in holes of the head of the standard 3, the table 16 and the base-plate. Its lower end carries a nut 18 and a counter-nut 19, which, under the action of the coiled spring 20, surrounding the top of the rod 17, bears against the under side of the collar 11, and thereby controls the position of the lower die 13. The spiral spring 21 arranged in a recess of the standard 3 and adapted to be put in tension by turning the bolt 22, has its free end bearing upon the collar 11, thereby tending to draw the lower die 13 downward. The hopper 23 for receiving the material from which the tablets are to be molded, is mounted upon a carriage 24 adapted to slide in guides formed on the table 16. The said carriage is provided with a transverse groove 25 into which takes the crank pin of a crank 26 made of wire and loosely mounted upon a tubular standard 27, which is inserted into the table 16 and surrounds the cylindrical rod 17. A coiled spring 28 having its top end secured to the wire crank 26 and its bottom end inserted into a hole of the table 16, always tends to keep the hopper-carriage in the position shown in Figs. 1 and 3, and is put in tension by the displacement of the carriage. The said crank 26 has the portion corresponding to its eye so shaped that, on the screw 1 descending, the crank is acted upon by the cam 7. The other cam 6 co-operates with a tappet 29 formed on a collar 30, which is fastened to the cylindrical rod 17 and provided with a plane face in contact with a plane plate 31 for preventing the rod 17 from turning round its axis.

The operation of the machine is as follows: By turning the screw 1 in the direction of the arrow in Fig. 1, the same is caused to descend, and the lower cam 7 of the sleeve 2 acts upon the wire crank 26, which is thereby caused to displace the carriage 24 upon which the hopper 23 is mounted. As soon as the carriage 24 is pushed beyond the matrix 14, a concentric portion of the cam 7 comes into contact with the crank and keeps the carriage in the position it has attained. The screw 1 continuing to descend, a tablet is molded between the upper die 4 and the lower die 13. During the descent of the screw 1, the upper cam 6 passes over the tappet 29, whereby the rod 17 is lowered, and afterward, when the said cam slides beyond the tappet, the spring 20 raises the rod 17 into its former position, thereby placing the tappet 29 above the cam 6. The pressing of the tablet being finished, the screw 1 is turned in the opposite direction, and thereby the cam 6 is caused to pass below the tappet 29 and to raise, by means of the same, the rod 17, whose nut 18 carries along the collar 11. As this collar 11 is rigidly connected with the lower die 13, this latter is raised and caused to eject the molded tablet. At the same time, the crank 26 is released by the lower cam 7, and under the action of the coiled spring 28 swings backward, carrying along the hopper-carriage 24, which pushes the tablet sidewise. Immediately afterward the cam 6 having hitherto kept the tappet 29 raised, slides beyond this tappet, thereby allowing the spiral spring 21 to lower the lower die into its normal position. The material contained in the hopper 23 then enters the matrix 14 again. The capacity of the matrix is adjusted by partly screwing the tubular screw 9 in or out, as this screw supports the lower die 13.

What I do claim as my invention, and desire to secure by Letters Patent, is—

1. In a screw press for molding tablets, the combination with the screw and the matrix of a carriage adapted to slide to and fro over the matrix, a supply hopper carried by the said sliding carriage, a crank geared with the carriage, a spring tending to keep the carriage above the matrix, and a cam mounted on the screw and adapted so to operate the crank that the carriage is pushed away from the matrix, substantially as and for the purpose described.

2. In a screw press for molding tablets, the combination with the screw and the lower die or movable matrix bottom, of a laterally projecting arm rigidly connected with the lower die, an endwise movable rod parallel to and guided by the side of the screw, a tappet secured to the bottom portion of the said rod in such a position as to project below the lateral arm of the lower die, a spring tending to keep the rod raised, a spring tending to lower the lower die, a second tappet secured to the top portion of the said rod, and a cam secured to the screw and adapted so to cooperate with the said second tappet that, on the screw being lowered, the cam carries along the tappet and passes below the same, and on the screw being raised, it raises the tappet, substantially as and for the purpose described.

In testimony whereof I have signed my name to this specification in the presence of two subscribing witnesses.

HUBERT ENDEMANN.

Witnesses:
 JOS. SCHASCHE,
 ALVESTO S. HOGUE.